US010077682B2

(12) United States Patent
Magee

(10) Patent No.: US 10,077,682 B2
(45) Date of Patent: Sep. 18, 2018

(54) SYSTEM AND METHOD FOR MANAGING HEAT DUTY FOR A HEAT RECOVERY SYSTEM

(71) Applicant: General Electric Company, Schenectady, NY (US)

(72) Inventor: Jeffrey Fredrick Magee, Longmeadow, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 89 days.

(21) Appl. No.: 15/387,204

(22) Filed: Dec. 21, 2016

(65) Prior Publication Data

US 2018/0171828 A1 Jun. 21, 2018

(51) Int. Cl.
*F01K 3/26* (2006.01)
*F01K 23/10* (2006.01)
*F01K 13/02* (2006.01)
*F01K 7/04* (2006.01)
*F01K 7/08* (2006.01)
*F01K 23/06* (2006.01)
*F01K 7/16* (2006.01)
*F01K 7/24* (2006.01)
*F01K 7/28* (2006.01)

(52) U.S. Cl.
CPC .............. *F01K 3/265* (2013.01); *F01K 7/04* (2013.01); *F01K 7/08* (2013.01); *F01K 7/165* (2013.01); *F01K 7/24* (2013.01); *F01K 7/28* (2013.01); *F01K 13/02* (2013.01); *F01K 23/06* (2013.01); *F01K 23/10* (2013.01)

(58) Field of Classification Search
CPC .......... F01K 3/265; F01K 23/10; F01K 7/165; F01K 7/28; F01K 7/08; F01K 7/24; F01K 23/06; F01K 7/04; F01K 13/02
USPC ...................................... 60/39.182, 664, 667
See application file for complete search history.

(56) References Cited

U.S. PATENT DOCUMENTS

| 6,041,588 | A * | 3/2000 | Bruckner | F01K 23/106 |
| | | | | 60/39.182 |
| 6,216,436 | B1 * | 4/2001 | Ranasinghe | F01K 23/068 |
| | | | | 60/39.12 |
| 8,141,367 | B2 * | 3/2012 | Rancruel | F02C 6/18 |
| | | | | 60/39.182 |
| 8,453,467 | B2 | 6/2013 | Hood, III et al. | |

(Continued)

FOREIGN PATENT DOCUMENTS

CN 104344764 A 2/2015
DE 102012010681 A1 12/2013
(Continued)

*Primary Examiner* — Hoang Nguyen
(74) *Attorney, Agent, or Firm* — Fletcher Yoder, P.C.

(57) ABSTRACT

A system includes an HRSG that includes a plurality of heat exchanger section fluidly coupled to each other. The plurality of heat exchanger sections comprises at least one economizer, at least one evaporator, at least one reheater, and at least one superheater. In addition, the HRSG includes an additional heat exchanger section coupled to two different heat exchanger sections of the plurality of heat exchanger sections. Further, the HRSG includes a controller programmed to selectively fluidly couple the additional heat exchanger section to one of the two different heat exchanger sections to alter a heat duty for the selected heat exchanger section fluidly coupled to the additional heat exchanger.

20 Claims, 6 Drawing Sheets

(56) References Cited

U.S. PATENT DOCUMENTS

| | | |
|---|---|---|
| 9,105,894 B2 | 8/2015 | Perry et al. |
| 9,370,815 B2 | 6/2016 | Jin et al. |
| 9,448,011 B2 | 9/2016 | MacKelvie |
| 2010/0024430 A1* | 2/2010 | Hofmann ............... F01K 15/00 60/772 |
| 2010/0031933 A1* | 2/2010 | Narayan ............... F01K 23/10 123/543 |
| 2013/0306290 A1 | 11/2013 | MacKelvie |
| 2013/0312445 A1 | 11/2013 | Isetti et al. |
| 2014/0326197 A1 | 11/2014 | Deivasigamani et al. |
| 2015/0168073 A1 | 6/2015 | Bugler, III et al. |
| 2016/0149276 A1 | 5/2016 | Elliot et al. |
| 2016/0161189 A1 | 6/2016 | Borghese et al. |

FOREIGN PATENT DOCUMENTS

| | | |
|---|---|---|
| DE | 102012208992 A1 | 12/2013 |
| DE | 102013111454 A1 | 4/2014 |
| DE | 102012017194 A1 | 5/2014 |
| DE | 102013224125 A1 | 6/2014 |
| DE | 102013225628 A1 | 6/2014 |
| EP | 2879228 A1 | 6/2015 |
| GR | 20130100388 A | 2/2015 |
| HK | 1126270 A1 | 11/2013 |
| KR | 101446921 B1 | 10/2014 |
| KR | 101468607 B1 | 12/2014 |
| KR | 20150058064 A | 5/2015 |
| KR | 20160088596 A | 7/2016 |
| TW | 367006 U | 8/1999 |

\* cited by examiner

SYSTEM AND METHOD FOR MANAGING HEAT DUTY FOR A HEAT RECOVERY SYSTEM

BACKGROUND OF THE INVENTION

The subject matter disclosed herein generally relates to a heat recovery system and, more specifically, to systems and methods for managing heat duty for a heat exchanger section of the heat recovery system.

Certain power plants include a combined cycle. The combined cycle may enable greater energy efficiencies, for example, by capturing energy that would have normally been lost through exhaust heat. Accordingly, a combined cycle may include systems that transform energy from exhaust heat into useful power. Fuel is supplied to a combustor of a gas turbine engine. The gas turbine engine, in turn, drives a generator for the production of electrical power or drives another type of load. Exhaust from the gas turbine engine may be supplied to a heat recovery system (e.g. to generate steam for a steam turbine). As such, the combined cycle power plants may be useful in converting fuel and exhaust heat into power.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a heat recovery steam generator (HRSG) that includes multiple heat exchanger sections fluidly coupled to each other. The multiple exchanger sections include at least one economizer, at least one evaporator, at least one reheater, and at least one superheater. In addition, the system includes an additional heat exchanger section coupled to two different heat exchanger sections of the multiple heat exchanger sections. Further, the system includes a controller programmed to selectively fluidly couple the additional heat exchanger section to one of the two different heat exchanger sections to alter a heat duty for the selected heat exchanger section fluidly coupled to the additional heat exchanger section.

In another embodiment, a heat recovery system configured to recover heat from a fluid includes multiple heat exchanger sections fluidly coupled to each other. The multiple heat exchanger sections include a first heat exchanger section and a second heat exchanger section. The heat recovery system further includes an additional heat exchanger section coupled to the first heat exchanger section and the second heat exchanger section. In addition, the heat recovery system includes a controller programmed to selectively fluidly couple the additional heat exchanger section to either the first heat exchanger section or the second heat exchanger section to alter a heat duty of the selected heat exchanger section fluidly coupled to the additional heat exchanger section.

In a third embodiment, a heat recovery system configured to recover heat from a fluid includes multiple heat exchanger sections fluidly coupled to each other. The multiple heat exchanger sections include a first heat exchanger section, a second heat exchanger section, and an additional heat exchanger section coupled to the first heat exchanger section and the second heat exchanger section. The multiple heat exchanger sections also include a first set of valves disposed along a first parallel circuit formed between the additional heat exchanger section and the first heat exchanger section. The multiple heat exchanger sections further include a second set of valves disposed along a second parallel circuit formed between the additional heat exchanger section and the second heat exchanger section. The multiple heat exchanger sections also include a controller programmed to selectively fluidly couple the additional heat exchanger section to either the first heat exchanger section or the second heat exchanger section to alter a heat duty for the selected heat exchanger section fluidly coupled to the additional heat exchanger. The controller is configured to cause the first set of valves to be open while keeping the second sets of valves closed when utilizing the first parallel circuit, and the controller is configured to cause the second set of valves to be closed while keeping the first set of valves closed when utilizing the second parallel circuit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
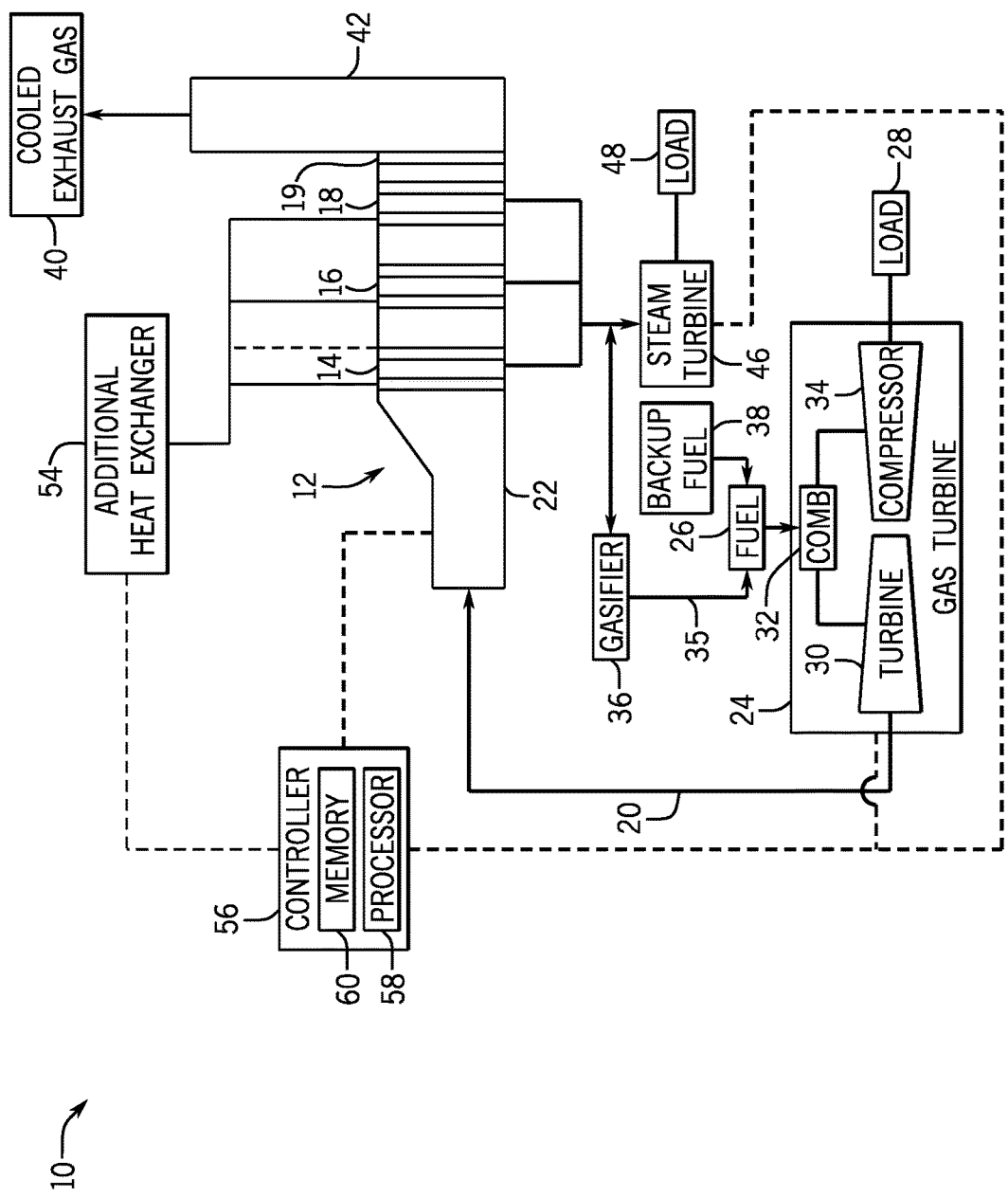
FIG. 1 is a schematic diagram of a combined cycle system having a heat recovery steam generator (HRSG) and an additional heat exchanger.

The disclosed embodiments include a heat recovery system (e.g., heat recovery steam generator (HRSG), such as a once through HRSG or a duct fired HRSG, or a drum-type utility boiler) that includes various sections, such as an evaporator, an economizer, a superheater, a reheater, etc., that enable steam production using exhaust gas from a gas turbine engine. Each of these sections has an associated heat duty (the amount of heat available for energy transfer) that is determined, in part, by the size of the section. Disclosed herein is an additional heat exchanger that can increase the heat duty of a specified part. The heat recovery system may be utilized with a combined cycle system such as, but not limited to, an integrated gasification combined cycle (IGCC) power plant With the foregoing in mind, FIG. 1 is a block diagram of an embodiment of a system 10 that includes a heat recovery system, such as an HRSG 12 (e.g., once through or duct fired), that may form part of an IGCC system. The HRSG 12 may include one or more HRSG sections (e.g., evaporator sections), each including a natural or forced circulation evaporator. As shown in FIG. 1, the HRSG 12 includes an economizer section 14, an evaporator section 16, a superheater section 18, and a reheater section 19. However, in other embodiments, some of these sections may be omitted and additional sections (e.g., 1 to 10 extra sections) also may also be added. For example, the HRSG may include more than one of the sections 14, 16, 18, and 19. In addition, the HRSG may include an additional heat exchanger section 54 that may be utilized to alter the heat duty of another section, thereby increasing the efficiency of the other section. The additional heat exchanger 54 may alter the heat duty by selectively creating a parallel circuit with one of the sections 14, 16, 18, or 19. Furthermore, the sections 14, 16, 18, 19, and 54 may be controlled by a controller 56. The controller 56 may open and close certain valves that fluidly couple the sections to one another.

Each section 14, 16, 18, and 19 is a heat exchanger. Although the present embodiment shows the economizer section 14 nearest an inlet section 22, and the reheater section 19 nearest the stack 42, it should be appreciated that the order of the sections may be in any suitable order. In addition, although FIG. 1 depicts only one economizer in economizer section 14, one evaporator in evaporator section 16, one superheater in superheater section 18, and one reheater in reheater section 19, it should be appreciated that each section may include any number of the respective components as is suitable, including 1, 2, 3, 4, 5, 6, or more. The inlet section 22 of the HRSG 12 is fluidly coupled to a gas turbine 24 that supplies the exhaust gas 20 to the HRSG 12. For example, the gas turbine 24 combusts a fuel 26 to drive a first load 28 and generate the exhaust gas 20. The first load 28 may, for instance, be an electrical generator for producing electrical power. The gas turbine 24 may include a turbine 30, a combustor or combustion chamber 32, and a compressor 34. However, the specific configuration of the gas turbine 24 may be implementation-specific and may include any number and configurations of turbine stages, compressor stages, and combustors.

In certain embodiments, for example during integrated operation, the gas turbine 24 may utilize syngas 35 generated in a gasifier 36 of the IGCC system as the fuel 26. In other embodiments, the gas turbine 24 may use back-up fuels 38 such as, but not limited to, natural gas, distillates, or a combination thereof as the fuel 26 (e.g., during non-integrated operation). As should be noted, the gas turbine 24 may also use a mixture of the syngas 35 and back-up fuels 38 as the fuel 26. The type of fuel 26 used by the gas turbine 24 may be determined based on the power requirements for the load 28. In certain embodiments, because a composition and temperature of the exhaust gas 20 may vary based on the type of fuel 26 used by the gas turbine 24, the HRSG 12 may include duct burners that heat the exhaust gas 20 to a desired temperature for efficient production of the steam in the HRSG 12.

The system 10 may also include a steam turbine 46 for driving a second load 48. Similar to the first load 28, the second load 48 may also be an electrical generator for generating electrical power. However, both the first load 28 and the second load 48 may be other types of loads capable of being driven by the gas turbine 24 and steam turbine 46. In addition, although the gas turbine 24 and steam turbine 46 may drive separate loads 28 and 48, as shown in the illustrated embodiment, the gas turbine 24 and steam turbine 46 may also be utilized in tandem to drive a single load via a single shaft.

In combined cycle systems such as system 10, hot exhaust (e.g., the exhaust gas 20) may flow from the gas turbine 24 and pass through the HRSG 12 to generate high-pressure, high-temperature steam, such as superheated steam. The steam produced by the HRSG 12 may then be passed through the steam turbine 46 for power generation. In addition, the produced steam may also be supplied to any other processes that use superheated steam. The gas turbine 24 generation cycle is often referred to as the "topping cycle," whereas the steam turbine 46 generation cycle is often referred to as the "bottoming cycle." By combining these two cycles as illustrated in FIG. 1, the system 10 may lead to greater efficiencies in both cycles. In particular, exhaust heat from the topping cycle may be captured and used to generate steam for use in the bottoming cycle.

The system 10 may also include a controller 56 (e.g., an electronic and/or processor-based controller) to govern operation of the system 10. The controller 56 may independently control operation of the system 10 by electrically communicating with sensors (e.g., temperature and pressure sensors), control valves, and pumps, or other flow adjusting features throughout the system 10. For example, the controller 56 may control the flow adjusting features within the sections 14, 16, 18, and 19, the inlet section 22, the gas turbine 24, the HRSG stack 42, the steam turbine 46, an additional heat exchanger 54, or any combination thereof, based on information received from sensors associated with the flow adjusting features. For example, if the controller 56 determines from received information that the heat duty of one of the sections 14, 16, 18, or 19 is inadequate, the controller may fluidly couple the additional heat exchanger 54 to the section with the inadequate heat duty to form a parallel circuit. Conversely, if the controller 56 determines from received information that the heat duty of the sections 14, 16, 18, and 19 is adequate, the controller may maintain the additional heat exchanger 54 fluidly separate from the sections 14, 16, 18, and 19. The controller 56 may include a distributed control system (DCS) or any computer-based workstation that is fully or partially automated. For example, the controller 56 can be any device employing a general purpose or an application-specific processor 58, both of which may generally include memory circuitry 60 for storing instructions executable by the processor 58. Data stored on the memory circuitry 60 may include, but is not limited to, drum fluid levels, flow rates, pressure, and temperature parameters of the system 10. The processor 58 may include one or more processing devices, and the memory circuitry 60 may include one or more tangible, non-transitory, machine-readable media collectively storing instructions executable by the processor 58.

Figure 2:
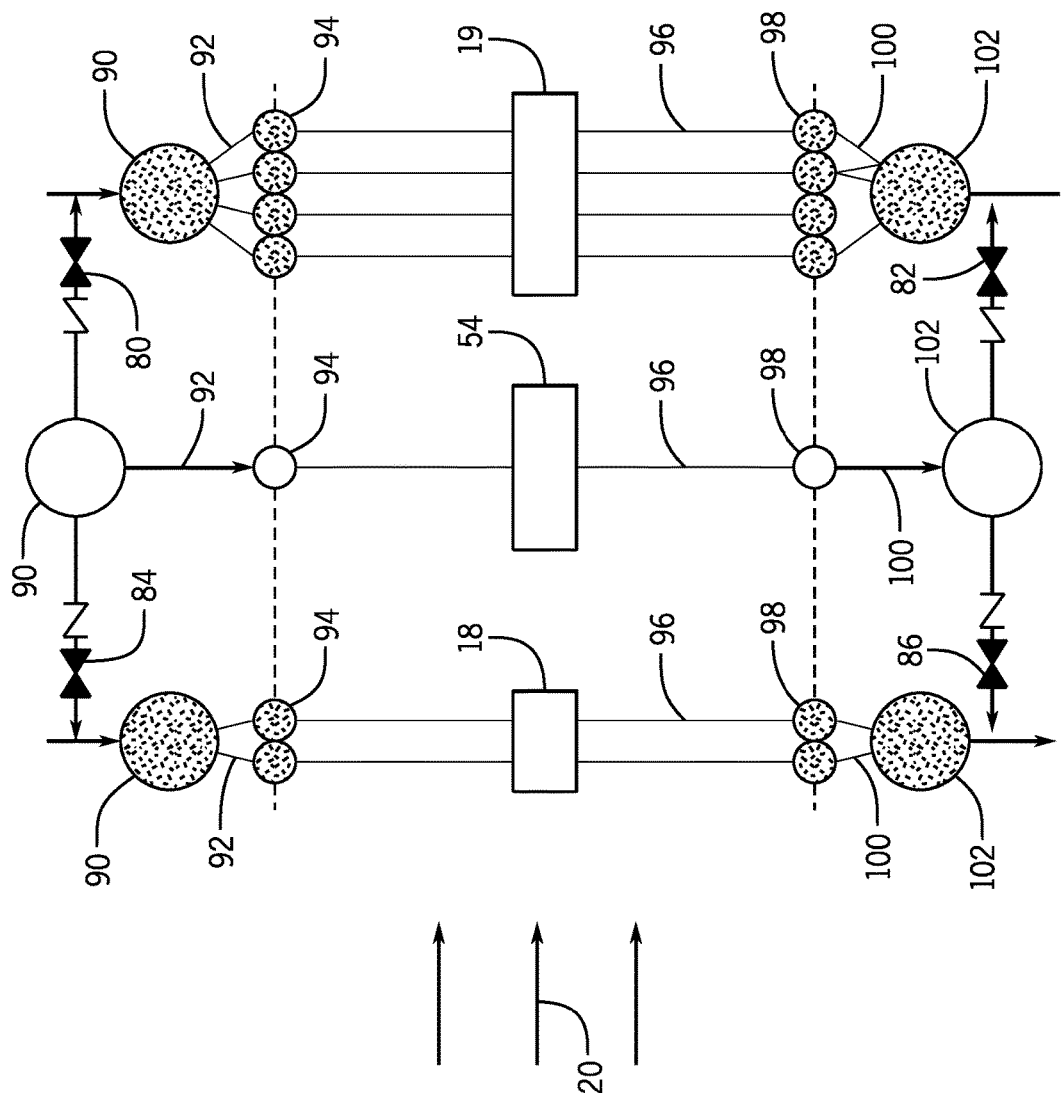
FIG. 2 is an embodiment of a portion of an HRSG including an additional heat exchanger.

FIG. 2 is an embodiment of a portion of an HRSG including an additional heat exchanger. Exhaust gas 20 passes over the sections 18, 19, and 54 and the exhaust gas 20 transfers a portion of its heat to the sections as it passes over them. The amount of heat transferred to each section is based, in part, on the surface area of the section. As depicted, the additional heat exchanger 54 is fluidly coupled to the reheater section 19 and the superheater section 18. However, in alternative embodiments, the additional heat exchanger 54 may be fluidly coupled to any combination of the sections 14, 16, 18, and 19. Further, the additional heat exchanger 54 may be fluidly coupled to only one of the sections 14, 16, 18, and 19. The additional heat exchanger 54 is fluidly coupled to the reheater section 19 at a first upper valve 80 and a first bottom valve 82. In operation, the first upper valve 80 and the first bottom valve 82 would both be either open or closed. In addition, the additional heat exchanger 54 is fluidly coupled to the superheater section 18 at a second upper valve 84 and a second bottom valve 86. In operation, the second upper valve 84 and the second bottom valve 86 would both be either open or closed. In addition, the valves of the additional heat exchanger 54 may only be open to one section at a time. For example, if the additional heat exchanger 54 is open to the reheater section 19, then it would be closed to the superheater section 18. The controller 56 may open and close valve 80, 82, 84, and 86 by sending control signals to actuators that are configured to open and/or close the valves 80, 82, 84, and 86.

In choosing whether to open the valves of the additional heat exchanger, the operator and/or controller 56 would first determine whether the heat duty of either the superheater section 18 or the reheater section 19 should be modified (e.g., increased). If the heat duty of one of the sections is insufficient, then the operator and/or controller 56 may open the valves of the additional heat exchanger 54 to increase the heat duty of the desired section. In opening valves of the additional heat exchanger 54, the operator and/or controller 56 is also creating a parallel circuit between the additional heat exchanger 54 and the selected section because, as described above, both one of the upper valves and a corresponding bottom valve is opened. Furthermore, the opening of the additional heat exchanger 54 increases the surface area that interfaces with the exhaust gas 20, thereby increasing the heat duty of the section the additional heat exchanger 54 is opened to. Conversely, if the operator and/or controller 56 determines that the heat duty of both section is sufficient, the operator and/or controller 56 leaves all of the valves of the additional heat exchanger 54 closed, so that the heat duty of both section remains the same. It should be noted that when the all of the valves of heat exchanger 54 are closed, no fluid will pass through the additional heat exchanger 54.

Each section of the additional heat exchanger 54, the economizer 14, the evaporator 16, the superheater 18, and the reheater 19 has similar structure. The water and/or steam first enters into a first manifold section 90. The water and/or steam then passes through a first link section 92 and into a second manifold section 94. From there, the water and/or steam passes through the tubes 96, which interact with the exhaust gas 20. After passing through the tubes 96, the water and/or steam flows through a third manifold section 98, a second link section 100 and a fourth manifold section 102. After that, the water and/or steam may flow to another section and repeat the process, or the water and/or steam may flow to the steam turbine 46. It should also be appreciated that the manifold sections 90, 94, 98, and 102 may include any suitable number of manifolds, including 1, 2, 3, 4, 5, 6, or more.

Figure 3:
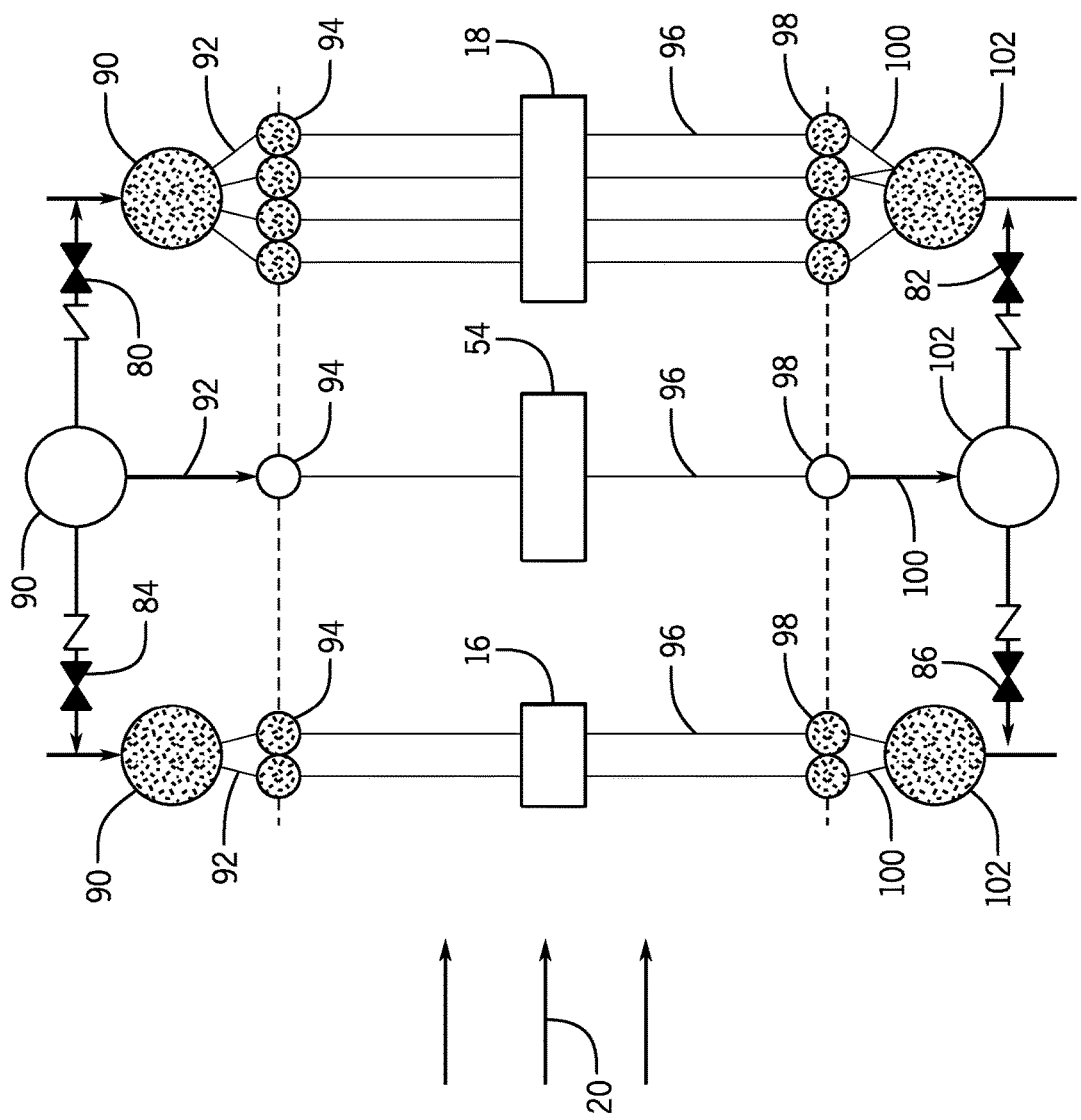
FIG. 3 is another embodiment of a portion of an HRSG including an additional heat exchanger.

FIG. 3 is another embodiment of a portion of an HRSG including an additional heat exchanger. In the illustrated embodiment, the additional heat exchanger section 54 is fluidly coupled to the superheater section 18 and the evaporator section 16. The structure and operation of the illustrated embodiment is similar to the embodiment described above in FIG. 2, only the evaporator section 16 is in place of the reheater section 19. For example, the evaporator section 16 includes the same structural components (e.g., the manifold sections 90, 94, 98, and 102, the link sections 92 and 100, and the tubes 96) as the reheater section 19. Further, the second upper valve 84 and the second lower valve 86 may be operated the same way and for the same purpose as described above. In addition, the exhaust gas 20 interacts with the tubes 96 of the evaporator section 16.

Figure 4:
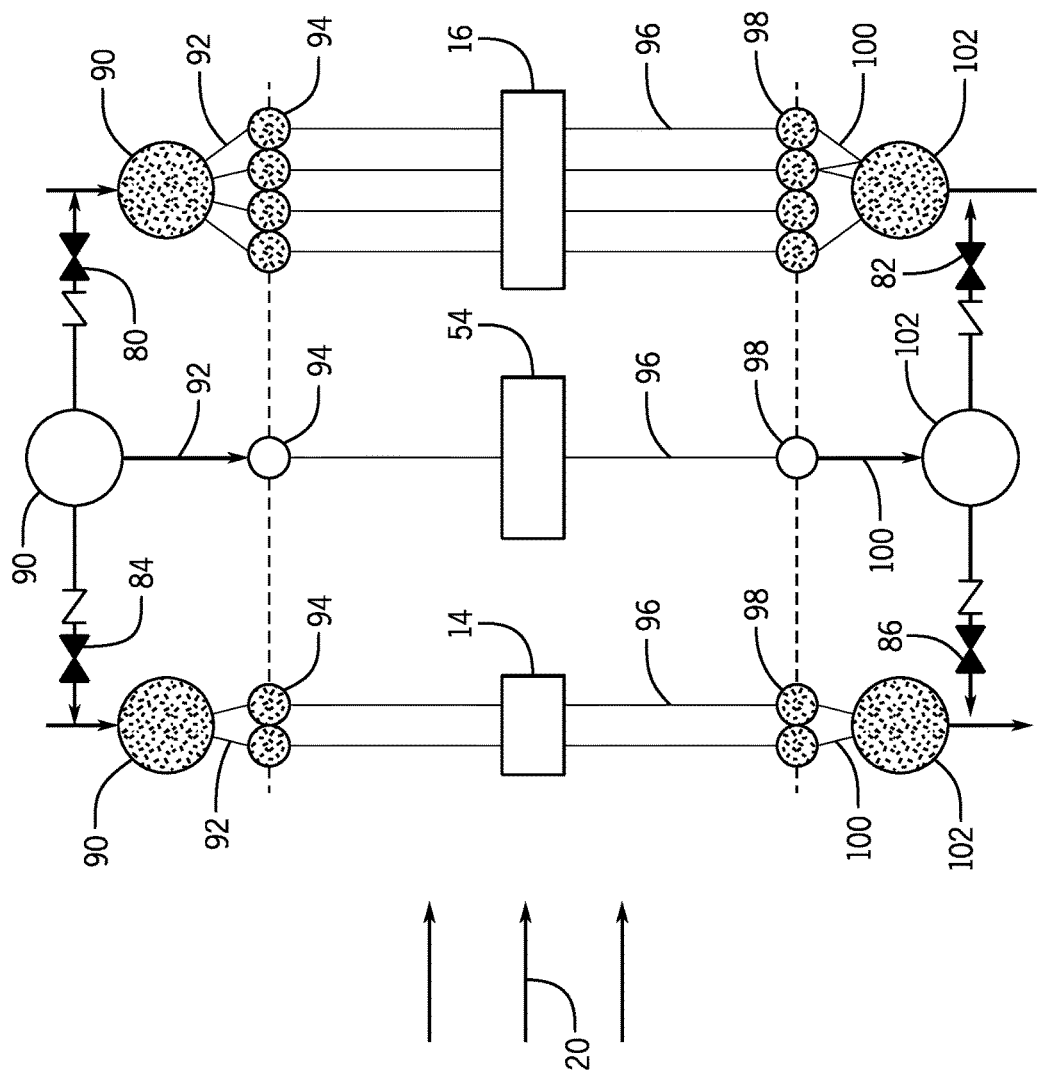
FIG. 4 is another embodiment of a portion of an HRSG including an additional heat exchanger.

FIG. 4 is another embodiment of a portion of an HRSG including an additional heat exchanger. In the illustrated embodiment, the additional heat exchanger section 54 is fluidly coupled to the economizer section 14 and the evaporator section 16. The structure and operation of the illustrated is similar to the embodiment described above in FIG. 2, only the evaporator section 16 is in place of the reheater section 19 and the economizer section 14 is in place of the superheater section 18. For example, the economizer section 14 and the evaporator section include the same structural components (e.g., the manifold sections 90, 94, 98, and 102, the link sections 92 and 100, and the tubes 96) as the superheater section 18 and the reheater section 19. Further, the valves may be operated the same way and for the same purpose as described above. In addition, the exhaust gas 20 interacts with the tubes 96 of both the economizer section 14 and the evaporator section 16.

Figure 5:
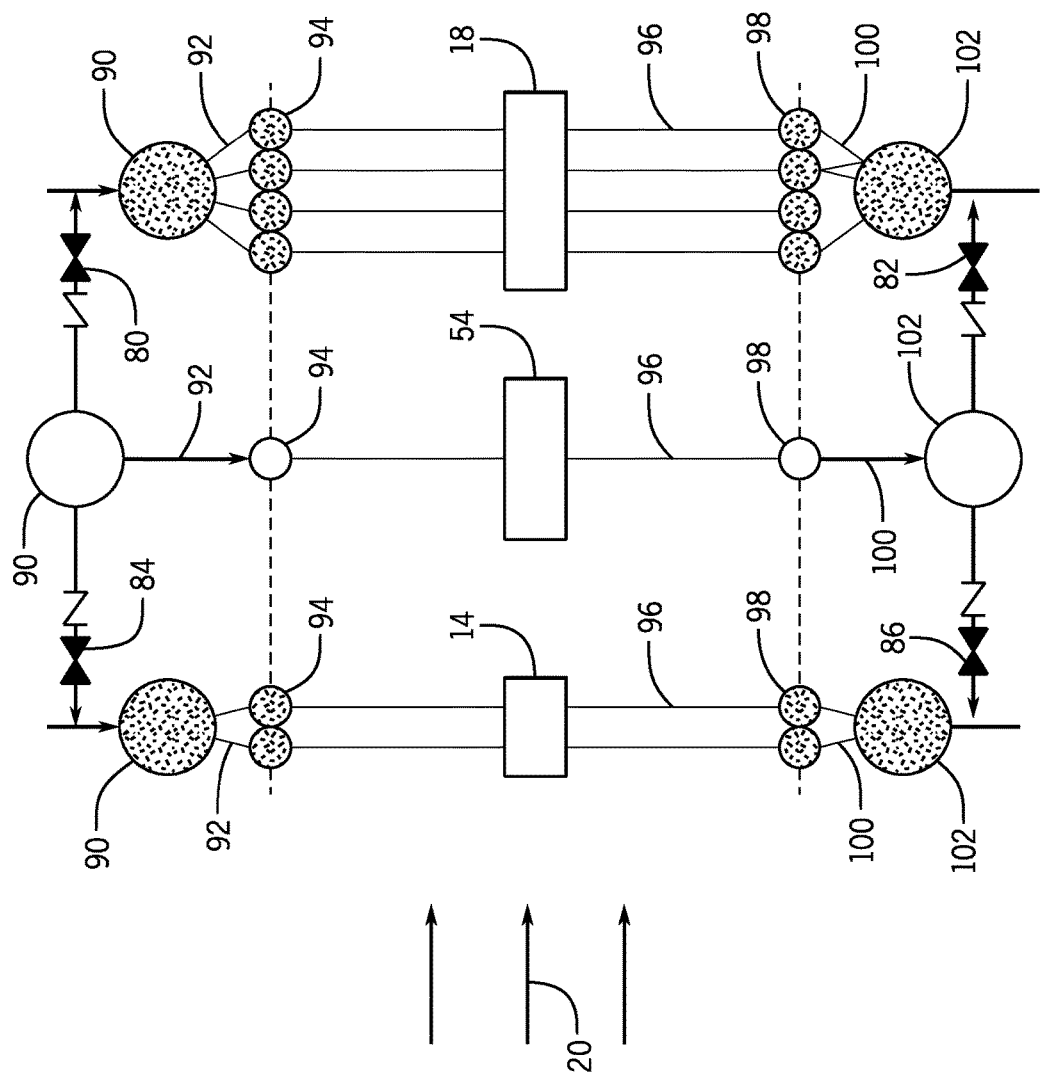
FIG. 5 is another embodiment of a portion of an HRSG including an additional heat exchanger.

FIG. 5 is another embodiment of a portion of an HRSG including an additional heat exchanger. In the illustrated embodiment, the additional heat exchanger section 54 is fluidly coupled to the superheater section 18 and the economizer section 14. The structure and operation of the illustrated is similar to the embodiment described above in FIG. 2, only the economizer section 14 is in place of the reheater section 19. For example, the economizer section 14 includes the same structural components (e.g., the manifold sections 90, 94, 98, and 102, the link sections 92 and 100, and the tubes 96) as the reheater section 19. Further, the second upper valve 84 and the second lower valve 86 may be operated the same way and for the same purpose as described above. In addition, the exhaust gas 20 interacts with the tubes 96 of the economizer section 14.

In the embodiments illustrated in FIGS. 2 through 5, the additional heat exchanger 54 is depicted as being coupled to two different heat exchanger sections. It should be appreciated the additional heat exchanger 54 may be coupled to any combination or number of heat exchanger sections. For example, the additional heat exchanger section 54 may be coupled to all four different sections, or to only one heat exchanger section. In addition, the additional heat exchanger section 54 may be coupled to multiple sections of the same kind.

Figure 6:
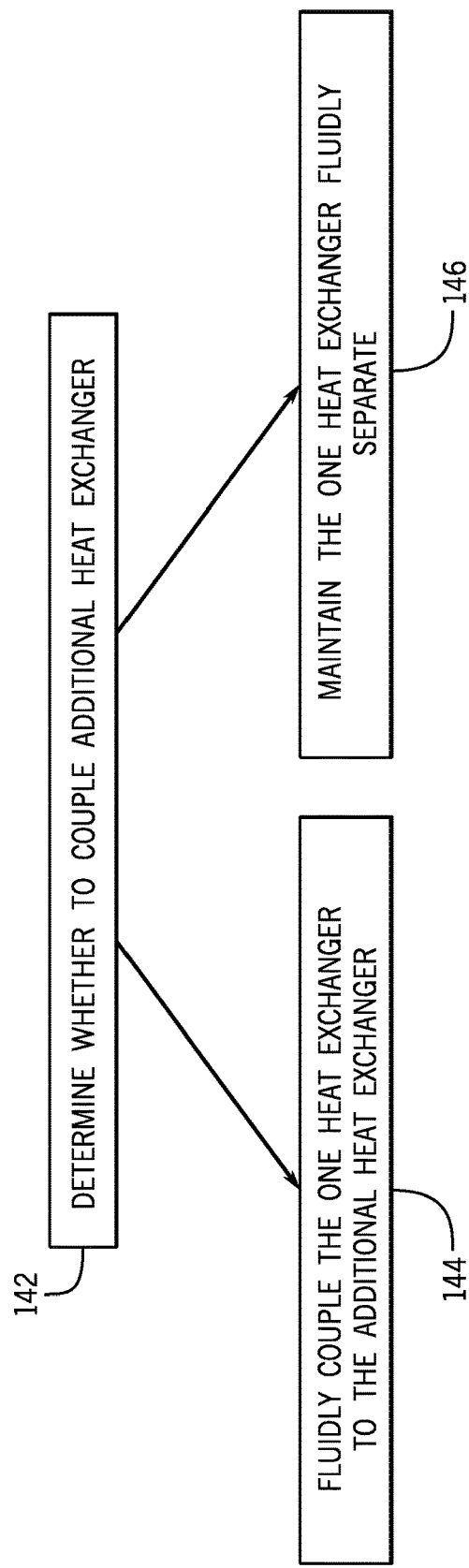
FIG. 6 is a flowchart depicting an embodiment of a method for altering the heat duty of a heat exchanger section.

FIG. 6 is a flow chart depicting an embodiment of a method 140 of altering the heat duty of one of the heat exchanger sections of a heat recovery system (e.g., HRSG, utility boiler, etc.). Although the following method 140 describes a number of operations that may be performed, it should be noted that the method 140 may be performed in a variety of suitable orders and all of the operations may not be performed. Further, some or all of the steps may be implemented by the controller 56.

In the present embodiment, the first step 142 is to determine, via the controller 56, whether to fluidly couple the additional heat exchanger section 54 to a particular heat exchanger section of the HRSG based on whether the heat duty of the particular heat exchanger section is adequate to handle a specific heat load. The second step 144 is to fluidly couple (e.g., valves may be opened or closed via control signals from the controller 56) the particular heat exchanger section to the additional heat exchanger 54 to form a parallel circuit having adequate heat duty to handle the specific heat load, when the heat duty of the particular heat exchanger section is not adequate to handle the specific heat load. The third step 146 is to maintain the particular heat exchanger section fluidly separate from the additional heat exchanger section 54, when the heat duty of the particular heat exchanger section is adequate to handle the specific heat load.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a heat recovery steam generator (HRSG), comprising:
      a plurality of heat exchanger sections fluidly coupled to each other, wherein the plurality of heat exchanger sections comprises at least one economizer, at least one evaporator, at least one reheater, and at least one superheater;
      an additional heat exchanger section coupled to two different heat exchanger sections of the plurality of heat exchanger sections; and
      a controller programmed to selectively fluidly couple the additional heat exchanger section to one of the two different heat exchanger sections to alter a heat duty for the selected heat exchanger section fluidly coupled to the additional heat exchanger.

2. The system of claim 1, wherein the two different heat exchanger sections comprise the at least one reheater and the at least one superheater.

3. The system of claim 1, wherein the two different heat exchanger sections comprise the at least one superheater and the at least one evaporator.

4. The system of claim 1, wherein the two different heat exchanger sections comprise the at least one evaporator and at least one economizer.

5. The system of claim 1, wherein the two different heat exchanger sections comprise the at least one economizer and the at least one superheater.

6. The system of claim 1, wherein a parallel circuit is formed between the additional heat exchanger section and the selected heat exchanger section when fluidly coupled together.

7. The system of claim 1, wherein the controller is configured to not selectively fluidly couple the additional heat exchanger section to any of the two different heat exchanger sections when the heat duty of two different heat exchanger sections is sufficient.

8. The system of claim 1, wherein the controller is configured to selectively fluidly couple the additional heat exchanger section to one of the two different heat exchanger sections to increase the heat duty for the selected heat exchanger section.

9. The system of claim 1, comprising a first set of valves disposed between the additional heat exchanger section and a first heat exchanger section of the two different heat exchanger sections, and a second set of valves disposed between the additional heat exchanger section and a second heat exchanger section of the two different heat exchanger sections, wherein the controller is configured to cause the first set of valves to be open to form a parallel circuit between the additional heat exchanger section and a first heat exchanger section while keeping the second set of valves closed.

10. The system of claim 1, comprising a combined cycle power plant comprising the HRSG.

11. A heat recovery system configured to recover heat from a fluid, comprising:
    a plurality of heat exchanger sections fluidly coupled to each other, wherein the plurality of heat exchanger sections comprises a first heat exchanger section and a second heat exchanger section; and
    an additional heat exchanger section coupled to the first heat exchanger section and the second heat exchanger section; and
    a controller programmed to selectively fluidly couple the additional heat exchanger section to either the first heat exchanger section or the second heat exchanger section to alter a heat duty for the selected heat exchanger section fluidly coupled to the additional heat exchanger.

12. The heat recovery system of claim 11, wherein the first heat exchanger section comprises a reheater and the second heat exchanger section comprises a superheater.

13. The heat recovery system of claim 11, wherein the first heat exchanger section comprises a superheater and the second heat exchanger section comprises an evaporator.

14. The heat recovery system of claim 11, wherein first heat exchanger section comprises at least one evaporator and the second heat exchanger section comprises an economizer.

15. The heat recovery system of claim 11, wherein first heat exchanger section comprises an economizer and the second heat exchanger section comprises a superheater.

16. The heat recovery system of claim 11, wherein a first parallel circuit is formed between the additional heat exchanger section and the first heat exchanger section when fluidly coupled together, and a second parallel circuit is formed between the additional heat exchanger section and the second heat exchanger section when fluidly coupled together.

17. The heat recovery system of claim 16, comprising a first set of valves disposed along the first parallel circuit between the additional heat exchanger section and the first heat exchanger section, and a second set of valves disposed along the second parallel circuit between the additional heat exchanger section and the second heat exchanger section, wherein the controller is configured to cause the first set of valves to be open while keeping the second sets of valves closed when utilizing the first parallel circuit, and the controller is configured to cause the second set of valves to be closed while keeping the first set of valves closed when utilizing the second parallel circuit.

18. The heat recovery system of claim 11, wherein the controller is configured to not selectively fluidly couple the additional heat exchanger section to the first heat exchanger section and the second heat exchanger section when the heat duty of both the first and second heat exchanger sections is sufficient.

19. The heat recovery system of claim 11, wherein the controller is configured to selectively fluidly couple the additional heat exchanger section to either the first heat exchanger section or the second heat exchanger section to increase the heat duty for the selected heat exchanger section.

20. A heat recovery system configured to recover heat from a fluid, comprising:
- a plurality of heat exchanger sections fluidly coupled to each other, wherein the plurality of heat exchanger sections comprises a first heat exchanger section and a second heat exchanger section; and
- an additional heat exchanger section coupled to the first heat exchanger section and the second heat exchanger section;
- a first set of valves disposed along a first parallel circuit formed between the additional heat exchanger section and the first heat exchanger section;
- a second set of valves disposed along a second parallel circuit formed between the additional heat exchanger section and the second heat exchanger section; and
- a controller programmed to selectively fluidly couple the additional heat exchanger section to either the first heat exchanger section or the second heat exchanger section to alter a heat duty for the selected heat exchanger section fluidly coupled to the additional heat exchanger, wherein the controller is configured to cause the first set of valves to be open while keeping the second sets of valves closed when utilizing the first parallel circuit, and the controller is configured to cause the second set of valves to be closed while keeping the first set of valves closed when utilizing the second parallel circuit.

* * * * *